Jan. 3, 1967  C. H. BIBER  3,295,424

SHUTTER TIMING APPARATUS

Filed June 17, 1963  3 Sheets-Sheet 1

INVENTOR.
Conrad H. Biber
BY Brown and Mikulka
and
Donald M. Sandler
ATTORNEYS

Jan. 3, 1967  C. H. BIBER  3,295,424
SHUTTER TIMING APPARATUS
Filed June 17, 1963  3 Sheets-Sheet 2

INVENTOR.
Conrad H. Biber
BY Brown and Mikulka
and
Donald M. Sandler
ATTORNEYS 3,295,424
Patented Jan. 3, 1967

3,295,424
SHUTTER TIMING APPARATUS
Conrad H. Biber, Needham, Mass., assignor to Polaroid Corporation, Cambridge, Mass., a corporation of Delaware
Filed June 17, 1963, Ser. No. 288,418
6 Claims. (Cl. 95—10)

This invention relates to a shutter mechanism for a camera, and more particularly to a shutter mechanism of the type that is responsive to light from a scene being photographed for causing the amount of light received by the film to be substantially independent of the level of scene brightness.

As used in this disclosure, the term "shutter mechanism" is intended to be applicable to the portion of a camera that includes the shutter, and the means by which the latter is operated to effect exposure. The shutter of one recently developed shutter mechanism of the type described comprises an opening blade and a closing blade, each movable on the camera housing between a blocking terminal position and an unblocking terminal position relative to the exposure aperture for controlling the passage of incident light therethrough. Prior to exposure, the opening blade is releasably held in blocking terminal position against the action of a spring urging the blade to its unblocking terminal position; and serves to hold the closing blade in unblocking position against the action of a spring urging the latter blade to its blocking position.

The means by which the above-described shutter is operated comprises a keeper mounted on the closing blade and a solenoid operably associated with a pole piece, the latter being so mounted on the camera housing that the keeper engages the pole piece and completes therewith a magnetic circuit when the closing blade is in unblocking position whereby energization of the solenoid creates a magnetic force on the keeper sufficient to maintain the closing blade in its unblocking position against the action of the spring acting thereon. An electrical circuit is also provided and may include a timing circuit and a voltage sensitive circuit. The timing circuit, when activated, generates a time variable voltage that reaches a level termed the trigger voltage in a period of time dependent on the resistance of a photoconductive element exposed to light from the scene being photographed. The resistance of the photoconductive element is so related to the level of scene brightness that the amount of light passing through the exposure aperture, in the time interval between activation of the timing circuit and when the voltage generated thereby reaches the trigger voltage, is substantially independent of the level of scene brightness, whether the scene brightness is constant or changing with time. Thus, the trigger voltage may be chosen to match such amount of light with the amount of light required to achieve proper exposure with the particular film being used.

The voltage sensitive trigger circuit energizes the solenoid substantially at the same time the opening blade is released and the timing circuit is activated so that the solenoid is effective to maintain the closing blade in unblocking position as the opening blade moves towards its unblocking position to initiate exposure. In addition, the trigger circuit is responsive to the voltage generated by the timing circuit for deenergizing the solenoid when the trigger voltage is reached. After this occurs, the closing blade will be released and move toward blocking position to terminate exposure. If the time for the two blades to move between their respective terminal positions is the same, the exposure time is essentially equal to the time that the solenoid is energized even though the two times are not coincident; and the amount of light received by the film is substantially independent of the level of scene brightness.

Where the camera, into which the shutter mechanism above described is incorporated, is to be battery operated, and a transistorized voltage sensitive trigger circuit is to be employed to minimize current drain, operation of the shutter mechanism becomes sensitive to temperature. The dependency of such operation on ambient temperature may manifest itself by causing the amount of light received by the film to be directly related to changes in ambient temperature when the trigger circuit operates properly even though the amount of light is substantially independent of the level of scene brightness; as well as by causing malfunctions characterized by failure of the solenoid to maintain the closing blade in its unblocking position until the timing circuit generates the trigger voltage. If the film being used will produce acceptable pictures only if the amount of light provided for the film is inversely related to changes in ambient temperature, there is an inherent inability for a shutter mechanism of the type described to automatically achieve proper film exposure even in the absence of malfunctions.

It is therefore a primary object of the present invention to provide, in a shutter mechanism of the type described, a temperature compensation means effective to reduce the likelihood of malfunctions associated with premature release of the closing blade and simultaneously effective to beneficially change the manner in which the amount of light provided for the film is dependent on temperature.

It is still a further object of the present invention to provide temperature compensation means which causes the amount of light provided for the film by the shutter mechanism to change inversely with changes in temperature.

Briefly, the invention involves a recognition that the temperature sensitivity of the transistorized trigger circuit causes the current in the solenoid to be directly related to variations in ambient temperature with the result that the magnetic force between the pole piece and the keeper, as well as the trigger voltage, are both directly related to variations in ambient temperature. As a result, the holding force on the closing blade as well as the exposure time decrease with temperature. If, when the temperature is at the minimum design level, the parameters of the trigger circuit are adjusted to provide current sufficient to produce the necessary holding force and a trigger voltage sufficient to provide the proper amount of light for the film, then at all higher temperatures, there is excessive current furnished to the solenoid, which wastes the battery, and excessive amounts of light furnished to the film, which may result in overexposure. The invention accordingly utilizes temperature compensation means having two portions, each performing an interrelated function. One portion is effective, depending upon the film being used, either to make the solenoid current substantially independent of variations in ambient temperature and maintain the trigger voltage independent of temperature; or to change the dependency of the current such that it is inversely instead of directly related to variations in ambient temperature, and cause the trigger voltage to change inversely with variations in temperature. In this manner, premature release of the closing blade is precluded without excessive battery drain while permitting the amount of light received by the film to substantially match the latter's requirements as the temperature changes. The other portion of the compensating means is effective to provide a better match between the amount of light received by the film and the amount required for proper exposure where the first portion of the compensation means cannot achieve this result alone.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein.

Figure 6:
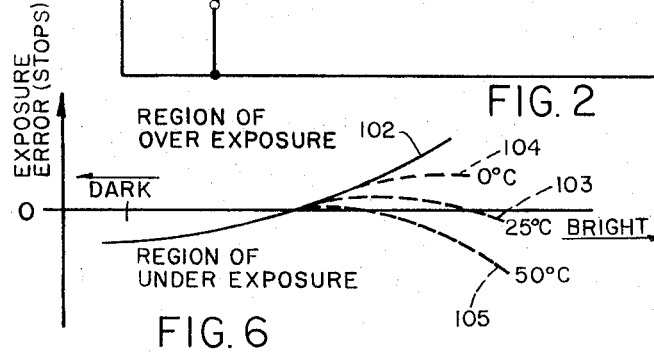
Figure 3:
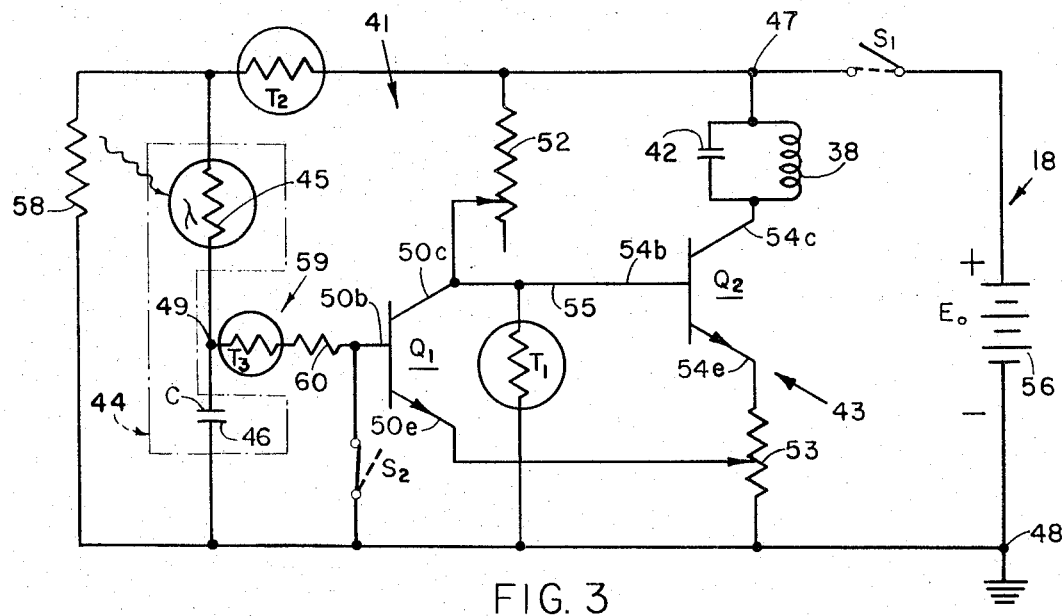
FIG. 3 is a schematic electrical diagram like that shown in FIG. 2 except showing the present invention incorporated therein.
Figure 4:
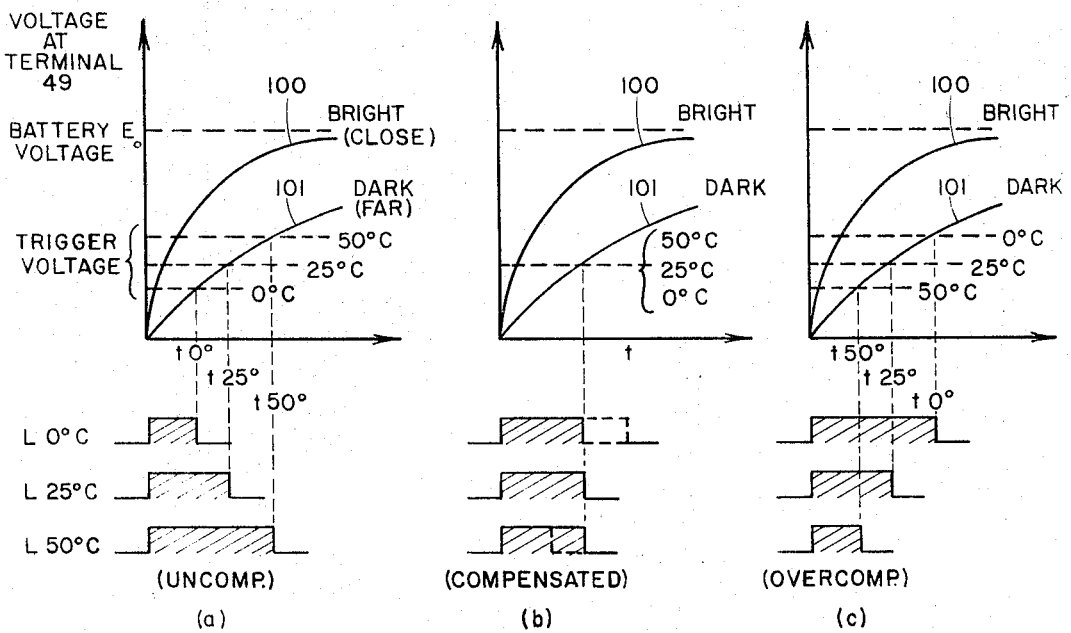
FIG. 4a is a graph showing the variation with time of the voltage generated by the timing circuit shown in FIG. 2 for two conditions of steady state scene brightness and illustrating the temperature dependence of the trigger voltage and showing how the amount of light received by the film varies with temperature at a constant level of scene brightness.
Figure 7:
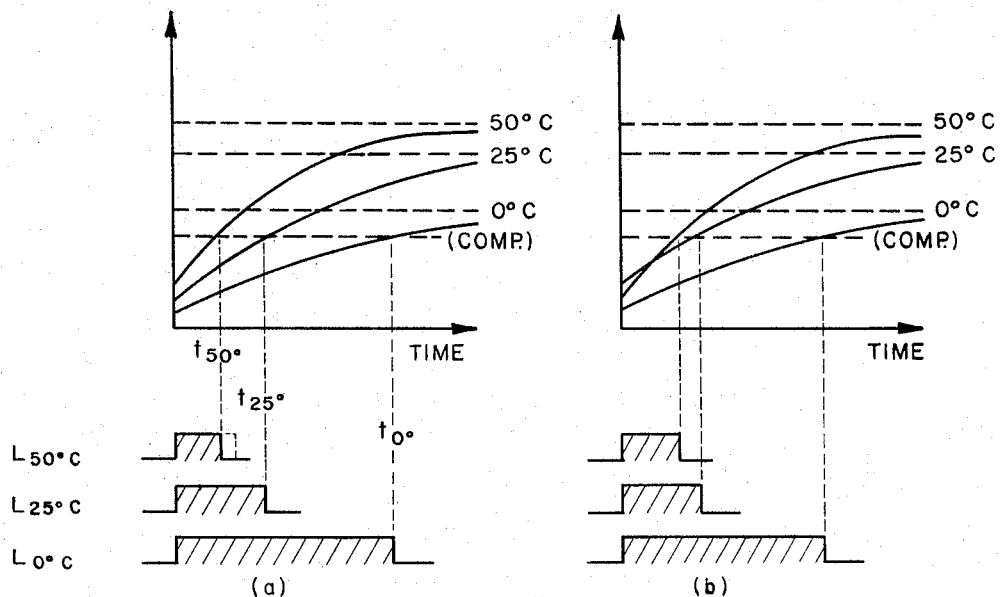

FIGS. 4b and c are graphs similar to FIG. 4a except showing the effect of compensating and overcompensating the trigger circuit in the manner shown in FIG. 3;

FIG. 5a is a graph showing the variation with time of the voltage generated by the timing circuit shown in FIG. 3 and illustrating the effect of the temperature dependence on the upper bound toward which the capacitor of the timing circuit charges when the trigger voltage is compensated, and showing how the amount of light varies with temperature at a constant level of scene brightness;

FIGURE 5b is a graph similar to FIG. 5a except showing how the amount of light changes when the trigger voltage is overcompensated;

FIG. 6 is a plot of exposure error vs. level of scene brightness showing the effect of ambient temperature at relatively high levels of scene brightness;

FIG. 7a is a graph similar to FIG. 5a except showing the result of using a fixed high light level compensating resistor; and FIG. 7b is a graph similar to FIG. 5a except showing how the high level compensation resistor is made temperature dependent to reduce the exposure error.

The shutter mechanism to be described is shown in the drawing as embodied into a camera having a particular type of shutter, but the latter is for the purpose of illustrating the invention in a simple environment, it being understood that other types of shutters could also be used with the shutter mechanism disclosed and claimed herein in order to derive the new and improved results attendant thereto.

Figure 1:
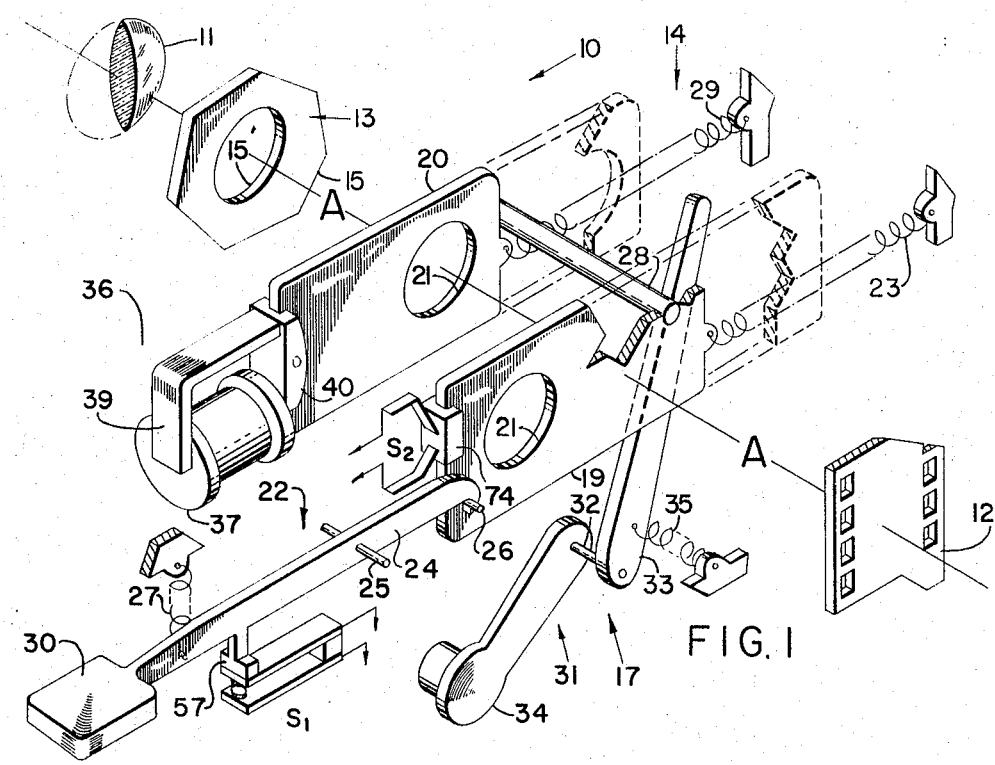
FIGURE 1 is a schematic representation of a camera having shutter means particularly well adapted for use with the present invention.

Referring now to FIGURE 1, camera 10 is shown schematically as including lens 11 for receiving light from a scene being photographed, and focusing it through an aperture in diaphragm means 13 onto film 12 to effect exposure of the latter by the proper operation of shutter mechanism 14 which is interposed in the optical path of the light.

Diaphragm 13 may take the form of a disc 15 mounted on the camera housing. Disc 15 contains exposure aperture 15' of preselected area aligned with the optical axis A—A of the camera.

Shutter mechanism 14 may include shutter means 17, and shutter control means 18. Shutter means 17 may take the form of a pair of planar, opaque blades 19 and 20, each provided with an exposure orifice 21, and mounted in tracks (not shown) so as to be normal to the optical axis, and reciprocable between terminal positions into intersection therewith. Each of the blades has one terminal position at which the solid portion overlies and totally blocks the exposure aperture in diaphragm means 13 (closed position), and another terminal position at which the exposure orifice is aligned with the exposure aperture (open position). Between these two terminal positions, each blade has various intermediate positions at which it covers various portions of the exposure aperture. In accordance with convention, it is assumed that the intermediate position at which half of the exposure aperture is covered is the position at which exposure is either initiated or terminated as the case may be. The blade that causes exposure to be intiated is called the "opening" blade. The terminal position at which the opening blade is closed is termed the "blocking" position, while the position intermediate the two terminal positions of the opening blade at which it initiates exposure is termed the "unblocking" position. Conversely, the blade that causes exposure to be termianted is called the "closing" blade. The terminal position at which the closing blade is open is termed the unblocking position, while the position intermediate the two terminal positions of the closing blade at which it terminates exposure is termed the blocking position.

Prior to initiation of exposure, the blades are as shown in the solid lines of FIGURE 1, inspection of which will indicate that releasable coupling means 22 is engaged with opening blade 19 to hold the latter in blocking position against the bias of spring means 23 which urges the blade toward unblocking position. Coupling means 22 includes latch 24 pivotally mounted on pin 25 and engaged with latch pin 26 attached to blade 19. Latch spring 27 engaged with latch 24 urges the latter into latching contact with pin 26. Reset bar 28 is rigidly attached to the end of blade 19 opposite exposure orifice 21, and extends normal thereto into the path of movement of closing blade 20. When the opening blade is held in blocking position by coupling means 22, bar 28 is effective to engage blade 20 to maintain the latter, in open position against the bias of spring means 29 urging the closing blade toward its blocking position. As can be seen from the drawing, bar 28 does not interfere with the independent movement of opening blade 19 to its open position.

Such movement takes place upon manual depression of end portion 30 of latch 24, which rotates the latter about pivot 25 out of engagement with pin 26. Upon disengagement of coupling means 22 from opening blade 19, the latter moves out of blocking position toward open position, and bar 28 is no longer effective to maintain closing blade 20 in its open position. However, initial movement of opening blade 19, in response to the disengagement of coupling means 22 therefrom, is effective to cause shutter control means 18, in a manner to be described later, to retain closing blade 20 in its open position for a preseletced period of time depending on the level of scene brightness. Since the opening blade moves to unblocking position while the shutter control means releasably retains the closing blade in open position, exposure is initiated. In other words, the shutter operator means is so operably associated with the shutter means, that the latter is caused to initiate exposure in response to actuation of the shutter operator means. At the end of said preselected period of time, shutter control means 18 causes closing blade 20 to be released thus terminating exposure when the latter is moved from open to blocking position by the action of bias spring means 29.

When exposure is terminated, blades 19 and 20 are in the position shown by the broken lines of FIGURE 1. That is to say, blade 19 is in open position and blade 20 is in blocking position, with reset bar 28 again engaged with blade 20. Having completed the exposure cycle, the blades are returned to their normal positions by reset mechanism 31 which includes reset shaft 32 rotatably mounted on the camera housing, reset lever 33 rigidly fixed to one end of shaft 32 and manual reset actuator 34 rigidly fixed to the other end of the shaft. Spring means 35 biases lever 33 to its normal position out of the path of movement of reset bar 28. However, the manual rotation of lever 33 against spring 35, achieved by the manual rotation of actuator 34 after exposure is terminated, causes lever 33 to engage bar 28 and move both blade 19 and blade 20 back to their normal, pre-exposure positions wherein the opening blade is in blocking position and the closing blade is in open position, the blades being held there by the action of coupling means 22. Upon release of actuator 34, lever 33 returns to its normal position, and the mechanism is ready for the next exposure cycle. If desired, the manual rotation of actuator 34 can be coupled to a film indexing mechanism.

Shutter control means 18 includes shutter operator means 36 actuable to cause shutter means 17 to initiate exposure, and deactuatable after said preselected period of time to cause the shutter means to terminate exposure, as previously described. Specifically, operator means 36 may take the form of an electromagnet 37 which has solenoid 38 wound around one leg of U-shaped polepiece 39, the free ends of which are coplanar and cooperable with magnetizable keeper 40 mounted on closing blade 20 when the latter is in open position. Pole-piece 39 and keeper 40, in such case, define a magnetic circuit of a particular reluctance such that a preselected magnetomotive force (solenoid current) applied to the magnetic circuit is sufficient to establish an attractive force between the pole-piece 39 and the keeper 40 that exceeds the separating force exerted on the closing blade by the biasing action of spring means 29, and is sufficient to resist dynamic loads due to the shock of the bottoming of the opening blade..

Shutter control means 18 further includes shutter timing apparatus 42, the purpose of which is to furnish an energizing current to the solenoid of electromagnet 37. Where the camera is to be portable and hence battery operated, it is essential to minimize current drain on the battery. With this in mind, premature release of closing blade 20 is prevented and accurate control of the time that the closing blade is held in unblocking position is obtained by rapid energizing the solenoid just prior to the release of the opening blade, and effecting a rapid release of the closing blade by the electromagnet at the proper time.

The solenoid must be energized before opening blade 19 begins to move out of unblocking position, because this blade, through bar 28, serves to initially position keeper 40 in engagement with pole-piece 39. Once the keeper has separated even slightly from the pole-piece, the reluctance of the magnetic circuit is so high, that the solenoid current is unable to produce an attractive force that will overcome the force of spring 29 urging the closing blade to blocking position.

For the reasons set forth above, namely rapid switching of the current input to the solenoid and low power consumption, shutter timing apparatus 41 conventionally takes the form of a modified Schmitt-type trigger circuit 43 responsive to the output voltage from timing circuit 44. The latter includes photoconductive element 45, such as a cadmium sulfide photocell or the like exposed to light from the scene being photographed and having a resistance functionally related to the level of scene brightness, and capacitor 46 connected in series between terminals 47 and 48 of the shutter timing apparatus. Circuit 44 constitutes a conventional integrator circuit whose input terminal is at 47 and whose output terminal is at 49, the connection between capacitor 46 and element 45.

Figure 2:
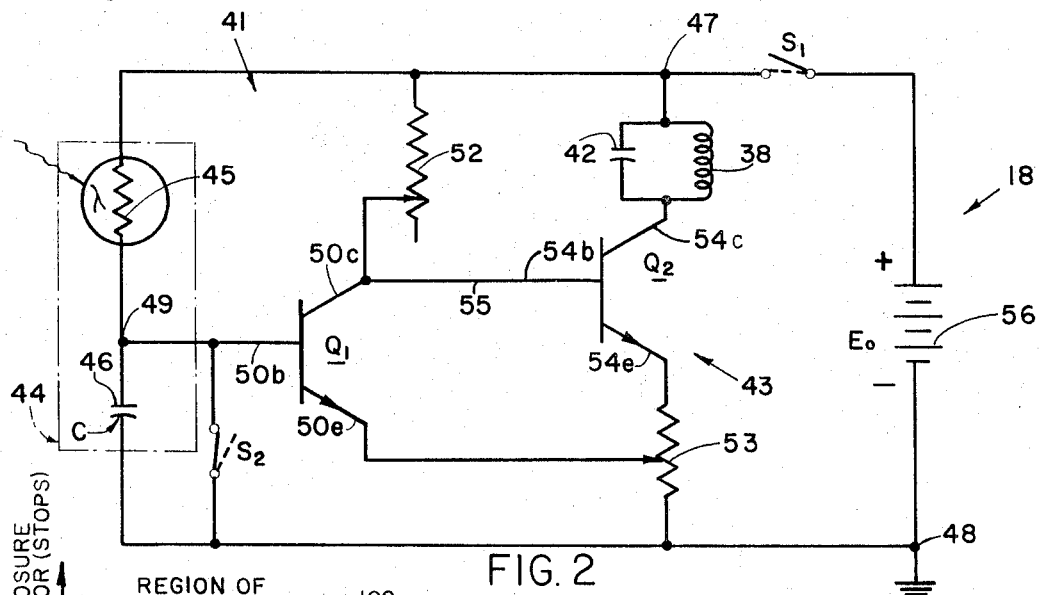
FIG. 2 is a schematic electrical diagram showing a conventional trigger circuit associated with the shutter means shown in FIGURE 1.

As shown in FIG. 2, circuit 43 has an input that is a normally not-conducting stage, and includes transistor $Q_1$ having low leakage current characteristics like a 2N930; and an output that is a normally conducting stage, and includes transistor $Q_2$ which should have a high gain like a 2N1474. $Q_1$ has base, collector and emitter electrodes $50b$, $50c$ and $50e$ respectively with electrode $50c$ connected through load resistor 52 to terminal 47; electrode $50e$ connected to terminal 48 through common emitter resistor 53; and electrode $50b$ connected to terminal 49. Element 45 constitutes a base bias resistor for $Q_1$ whose base is initially grounded through switch S2.

$Q_2$ has base, collector, and emitter electrodes $54b$, $54c$ and $54e$ respectively with electrode $54c$ connected to terminal 47 through solenoid 38 which constitutes the load for this stage. Electrode $54e$ is connected to terminal 48 through common emitter resistor 53, and the base of $Q_2$ is directly coupled to the collector output of $Q_1$ and to terminal 47 through base bias resistor 52. While the stages of circuit 43 have been characterized as "normally not-conducting" and "normally conducting," it should be obvious that this characterization is applicable only when a voltage source is applied across terminals 47 and 48.

With this conventional circuit, an operator may take a picture by depressing end portion 30 of lever 24. Switch operating arm 57 engages the contacts of S1 before rotation imparted to lever 24 effects its disengagement from pin 26, closing the contacts and applying battery 56, of voltage $E_0$, across terminals 47 and 48. In this way, the battery is used only during the taking of a picture and current drain is minimized. The battery will be applied across the terminals as long as the operator maintains lever 24 in its depressed state, and since human reaction time in depressing and releasing portion 30 and the inertial delay of the lever in returning to its normal position, substantially exceeds the longest exposure likely to be used under normal "snap-shot" conditions, the contacts of S1 will be closed for at least as long as the correct exposure time.

Recalling that S2 is initially closed, the closing of S1 causes instantaneous conduction of transistor $Q_2$, the latter operating as a common emitter amplifier with fixed base current bias furnished by the flow of current through adjustable resistor 52. Calibration adjustment of the latter permits the output current of $Q_2$ flowing through solenoid 38 to be selected such that there is sufficient magnetic induction in the magnetic circuit, comprising pole-piece 39 and keeper 40, to maintain the closing blade in its unblocking terminal position against the action of spring 29 after the opening blade begins to move out of its blocking terminal position prior to initiation of exposure. Such induction must likewise be sufficient to prevent shock due to bottoming of the opening blade from jarring the keeper from the pole piece. The initial flow of current through resistor 52 establishes a reverse bias condition on the collector-base junction of $Q_1$, since the base is initially held at ground as long as S2 remains closed. The initial flow of current through resistor 53 also establishes a reverse bias condition on the emitter-base junction of $Q_1$, and $Q_1$ is thus held cut off.

When lever 24 is disengaged from pin 26 the bias on the opening blade is effective to cause the latter to move towards its unblocking terminal position. Initial movement of the opening blade seperates conductive block 74 from the contacts of switch S2 thereby opening S2 and activating timing circuit 44, which is to say that a time variable voltage is generated at connection 49. Since timing circuit 44 is a conventional integrator circuit whose input is applied across element 45 and capacitor 46 in series, and whose output is taken across the capacitor, the voltage at terminal 49 changes exponentially with time. When the voltage at terminal 49 exceeds the voltage at the emitter of $Q_1$, as established by the setting of adjustable resistor 53, $Q_1$ is forward-biased into conduction. The voltage at which $Q_1$ is forward-biased is termed the trigger voltage, and the time between the activation of circuit 44 (i.e., the opening S2) and when the trigger voltage is generated is termed the trigger generation time. Obviously the trigger generation time can be controlled by the setting of resistor 53 on calibration.

When the trigger voltage is reached, $Q_1$ conducts, drawing collector current, lowering the voltage at the base of $Q_2$ and decreasing the forward-bias on the latter thereby reducing the flow of current in resistor 53. Because of the coupling between the emitter of $Q_1$ and resistor 53, the resultant reduction of current in resistor 53 causes the voltage at the emitter of $Q_1$ to drop causing $Q_1$ to conduct to an even greater extent and draw more collector current. This lowers the voltage at the base of $Q_2$ to the point where the emitter-base junction thereof becomes reverse-biased and $Q_2$ is cut off. Cut-off of $Q_2$ occurs at the same instant the voltage at terminal 49 reaches the trigger voltage because of the regenerative coupling between $Q_1$ and $Q_2$. As a result, the solenoid is rapidly deenergized. Capacitor 42 coupled across the solenoid prevents the voltage induced therein due to the changing current in the solenoid prior to release of keeper 40 and the changing flux in the magnetic field associated with movement of the keeper in the field, from damaging $Q_2$. The closing blade is thus released for movement to its terminal blocking position. If the time required for the opening blade to move to its exposure initiating position after S2 is opened is the same as the time for the closing blade to move to its exposure terminating position after the solenoid is deenergized, the time that the exposure aperture is uncovered by both blades (exposure time), will be substantially the same as the trigger generation time even though the exposure time interval and the trigger generation time are not entirely concurrent. Furthermore, since the time interval between energization of the solenoid and the release of the opening blade (S2 opened) is so small in comparison to the exposure time, the latter is essentially the time that the shutter operator means is actuated (solenoid is energized).

If element 45 is linear, which is to say that the resistance of the element is inversely proportional to the level of brightness over a range thereof, and if element 45 responds rapidly to transient conditions of lighting, the trigger generation time, in general, will be so related to the level of scene brightness that the time-integral of the brightness evaluated over the trigger generation time (or the amount of light passing through the exposure aperture) will be independent of the level of scene brightness. Thus, resistor 53 can be adjusted to provide a trigger voltage such that the timing circuit causes the amount of light passing through the exposure aperture during the trigger generation time to match the amount of light required to properly expose the film being used. However, even with a linear element that exhibits no response lag, the temperature sensitivity of the transistors of voltage sensitive trigger circuit 43 have an adverse effect on obtaining proper exposures. In general, the gain of $Q_2$ depends directly on ambient temperature with the result that the amount of current flowing in solenoid 38 is directly related to the temperature. In other words, the higher the temperature, the higher the gain and the greater the current through the solenoid. Since the current through resistor 53 also changes in the same manner with temperature, the voltage at the emitter of $Q_1$ will change directly with temperature. As a result, the trigger voltage is temperature sensitive, changing directly with variations in ambient temperature. The effect this has on the exposure can be seen from FIG. 4(a) which shows at 100 how the voltage at terminal 49 might change with time under either a bright steady-state light condition of flash bulb illumination of a close subject, and at 101 how the voltage might change under either a somewhat dull steady-state light condition or flash bulb illumination of a more distant subject. If the trigger circuit were adjusted under room temperature conditions (about 25° C.) until a trigger voltage that achieves correct exposure is obtained, the amount of light passing through the exposure aperture during the trigger generation time might be represented by area $L_{25°}$ under steady state lighting conditions. This represents the amount of light necessary to correctly expose the film. However, it is apparent that the amount of light at about 0° C. is less than the amount at 25° C.; and the amount of light at about 50° C. is greater than the amount at 25° C. Thus, underexposure occurs at ambient temperatures lower than the calibration temperature and overexposure occurs at higher temperatures. In addition to this difficulty, the variable nature of the current flow in the solenoid due to temperature variations raises the possibility that premature blade release will occur at low temperatures. Such possibility is raised when the setting of resistor 52 is adjusted to minimize current drain on the battery by providing just sufficient current in the solenoid at room temperature to properly hold the closing blade against the action of the closing spring, and resist dynamic loading of the keeper due to the shock imposed thereon by the bottoming of the opening blade when the latter reaches its terminal unblocking position. At temperatures lower than room temperature, the solenoid current is reduced and the holding force on the keeper becomes marginal. To change the adjustment of resistor 52 such that the proper holding force is available at low ambient temperature is to substantially increase the battery drain at normal temperatures.

In view of the above, it is seen that the temperature sensitivity of circuit 43 causes the amount of light passing through the exposure orifice during the trigger generation time to be directly related to changes in ambient temperature, even though such amount is independent of the level of scene brightness; and raises the possibility of premature closing blade release as ambient temperature decreases. In addition, some types of film in current use require that the amount of light to achieve proper exposure change inversely with variations in ambient temperature. In such cases, the amount of light passing through the exposure orifice when the circuit of FIG. 2 is not temperature-compensated, is illustrated by the cross-hatched areas in FIG. 4(a), and cannot provide proper exposure.

As a first step in compensating the circuit of FIG. 2, thermistor $T_1$ may be added between the base of $Q_2$ and ground as shown in FIG. 3. Thus, thermistor $T_1$ and resistor 52 defines a voltage divider which applies a portion of battery voltage $E_0$ to the base emitter of $Q_2$ when S1 is closed. As a result of current flowing in $T_1$, a forward bias is established and $Q_2$ conducts as previously described. Since the resistance of $T_1$ changes inversely with variations in ambient temperature, the current through $T_1$ is directly related to such variations, with the result that the voltage drop across resistor 52 is also directly related to such variations. The available voltage to forward bias $Q_2$, namely the voltage across $T_1$, is thus inversely related to variations in ambient temperature, with the result that the collector and emitter currents of $Q_2$ become substantially independent of temperature. In other words, if ambient temperature increases and the output current of $Q_2$ tends to increase, $T_1$ causes the forward bias to decrease tending to reduce the output current. The result is that the current can be kept about the same by matching the temperature characteristics of $T_1$ with those of $Q_2$.

Referring to FIG. 4(b), a trigger circuit compensated by $T_1$ causes the trigger voltage to become substantially independent of temperature variations, since such voltage depends only on the setting of resistor 53 and the current therethrough. The amount of light passing through the exposure aperture during the trigger generation time, as well as the magnetic force on the closing blade, are each independent of variations in ambient temperature.

As pointed out above, certain films require a greater amount of light to achieve proper exposure when the temperature decreases. If such films were being used, the temperature compensation achieved by $T_1$ as illustrated in FIG. 4(b) would achieve proper exposure at 25° C., but would be underexposed at 0° C. and overexposed at 50° C. The respective missing and added increments of amount of light are suggested by the areas within the dotted lines at the bottom of FIG. 4(b). To accommodate film of this nature, $Q_2$ may be overcompensated as illustrated in FIG. 4(c) by selecting $T_1$ such that the current through $Q_2$ is caused to be inversely related to variations in ambient temperature. In such case, the trigger voltage decreases with decreases in ambient temperature, and as shown in FIG. 4(c), the amount of light increases.

Figure 5:
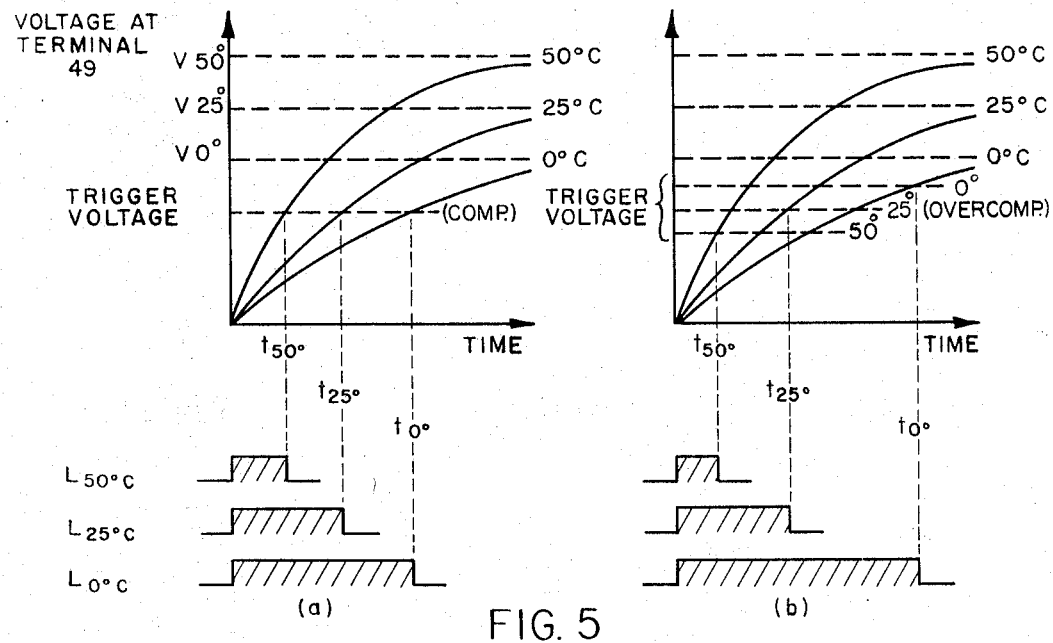

There are practical limits to the amount of overcompensation that can be achieved using $T_1$, particularly since it may be difficult to match the temperature characteristics of $T_1$ to the temperature characteristics of the film. Where this is the case, thermistor $T_2$ may be used, in conjunction with $T_1$, since the latter does provide a way to prevent premature release of the closing blade as ambient temperature decreases without excessive battery drain. Thermistor $T_2$ is inserted between terminal 47 and the input to timing circuit 44, the latter being shunted by resistor 58. Thus, $T_2$ and resistor 58 define a voltage divider which applies only a portion of battery voltage $E_0$ across the timing network. Since the resistance of $T_2$ is inversely related to variations in ambient temperature, the voltage at the input to the timing network (namely, the voltage across resistor 58) changes directly with variations in ambient temperature. This means that the upper bound, toward which capacitor 46 exponentially charges when the timing network is activated, increases with increases in ambient temperature. FIG. 5(a) shows the result of $T_2$ when $T_1$ just compensates the trigger circuit, the amount of light passing through the exposure aperture during the trigger generation time for representative ambient temperatures being shown as the crosshatched areas in the lower portion of FIG. 5. Thus, compensating $Q_2$ and providing $T_2$ qualitatively achieves the desired result in that the amount of light is changed inversely with variations in ambient temperature. However, quantitative control over the amount of light can be exerted by selectively over-or-under compensating $Q_2$. This is illustrated in FIG. 5(b), where overcompensation is shown, when the film being used requires even more light at lower temperatures.

When the photoconductive element of the timing circuit is nonlinear, and the amount of light for properly exposing the film being used in critical, it has been found that a failure to compensate for nonlinearity results in an exposure error of the type shown in FIG. 6. In this context, exposure error is intended to mean the logarithm to the base two of the ratio of the actual amount of light passing through the exposure aperture during the trigger generation time to the ideal amount of light required to properly expose the film, and is measured in stops. In general, the exposure error is functionally related to the level of scene brightness, and varies with the level of scene brightness somewhat as shown by curve 102. The error increases with increases in the level of brightness, becoming quite large under very bright conditions where the resistance of the element begins to approach a minimum. How significant this exposure error is depends upon the film being used since the tolerance on the amount of light to achieve correct exposure with some films is quite small. Thus, when film of this nature is used, the statement that the amount of light passing the exposure aperture during the trigger generation time is substantially independent of variations in the level of scene brightness means that small variations in such amount of light do not affect quality of the exposure. When using film having a small tolerance for variations in the amount of light sufficient to achieve proper exposure, the statement referred to above means that the timing circuit is compensated to reduce the error to a point where it is within the tolerance.

It is conventional to modify the exposure error curve in the region of light intensity where the photoconductive element becomes highly nonlinear by incorporating, between terminal 49 and switch S2, a fixed temperature-insensitive resistor, the effect of which is to cause an initial voltage to appear across capacitor 46 at the initiation of timing (opening of S2). Such voltage increases with increasing levels of scene brightness and changes the error response from the form shown in FIG. 6 by curve 102 to the form shown by curve 103. Where trigger circuit 43 has been compensated by introducing thermistors $T_1$ and $T_2$ for the reasons already indicated, the presence of a fixed high-end compensation resistor between terminal 49 and S2 alters the voltage response at terminals 49 due to the opening of S2 from the form shown at FIG. 5(a), for example, to the form shown at FIG. 7(a). The curves shown in FIG. 7(a) are typical for a level of scene brightness greater than the level at which curve 102 crosses the zero exposure error axis in FIG. 6. The presence of $T_2$ in the circuit makes the initial value of voltage on capacitor 46 temperature dependent. Thus, at a given level of brightness, a decrease in temperature (which increases the resistance of $T_2$) decreases the initial voltage on capacitor 46 which results in a longer trigger generation time. This means that curve 104 shown in FIG. 6 and corresponding to the error at 0° C. lies above curve 103. By similar reasoning, it can be seen that curve 105 corresponding to the error at 50° C. lies below curve 103. The curves shown in FIG. 6 are qualitative, and whether the error at 0° C. and at 50° C. must be compensated for, depends on the tolerance of the film being used. Where compensation is needed, it is apparent from inspection of FIG. 6 that such compensation should be such as to cause a reduction in trigger generation time as the temperature decreases from 25° C. and an increase in trigger generation time as the temperature increases from 25° C. The problem can be visualized by the crosshatched areas of FIG. 7(a) which represent the amount of light passed by the shutter (at a given level of scene brightness) as a function of ambient temperature. For example, the increase in light at 50° C. necessary to decrease the exposure error is illustrated by the dotted extension to the cross-hatched area associated with the amount of light at 50° C.

The problem is solved by substituting, for the fixed resistance conventionally placed between terminal 49 and S2, thermistor $T_3$ in series with fixed resistor 60, the latter two elements constituting high-end compensating means 59. The sum of the resistance of $T_3$ at 25° C. and the resistance of resistor 60 should equal the resistance of the replaced conventional fixed resistor with the result that at 25° C. the initial voltage on the capacitor remains unchanged. Since the time constant of the integrator (which depends essentially on the resistance of element 45 and the capacitor of 46) remains the same (at a given level of scene brightness), the trigger generation time at 25° C. remains unchanged. However, at 50° C., the presence of $T_3$ in means 59 causes the initial voltage on capacitor 46 to be less than the value were the high-end compensation means altogether independent of temperature, which means that the trigger generation time in increased somewhat thus increasing the amount of light passed by the shutter blades and decreasing the exposure error. Conversely, at 0° C., the trigger generation tme is decreased (since the initial voltage on capacitor 46 is greater than its value were the high-end compensation means altogether independent of temperature) thus decreasing the amount of light passed by the shutter blades and also decreasing the exposure error.

It is preferred to choose the resistance of resistor 58 and $T_2$ at the midpoint of the design temperature range such that they are each of the same order of magnitude;

and furthermore, about the same as the resistance of compensator means 59 at such midpoint. This criterion permits the compensator means 59 to exert control at the high light levels since the latter can be effective only when it is of the same order of magnitude as the resistance of element 45. In other words, if means 59 were 200 ohms at the midpoint and the resistance of element 45 were 500 ohms, about a third of the voltage across the timing circuit would appear across the capacitor. However, if resistor 58 and $T_2$ were several orders of magnitude larger, the voltage developed across the timing circuit would be so small as to practically approach zero and instead of curves like that shown in FIG. 7, curves like that of FIG. 5 result, and there is no high-end compensation achieved.

Those skilled in the art can now appreciate that the present invention involves a novel combination of temperature responsive devices which interact to reduce the likelihood of malfunctions associated with premature release of the closing blade and to simultaneously change, in a beneficial way, the manner in which the amount of light provided the film is dependent on temperature.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A shutter mechanism for a photographic camera having an exposure aperture for exposing to scene light a photosensitive material, the sensitivity of which may vary with changes in ambient temperature, comprising:
   shutter means movable into light unblocking and blocking positions relative to said exposure aperture to effect exposure;
   a photoconductive element exposed to scene light and having an electrical parameter which varies in response to the intensity of light incident thereon;
   an electrical control circuit responsive to said parameter of said photoconductive element automatically controlling the amount of light admitted through said aperture by said shutter means, said control circuit including first transistor means responsive to said photoconductive element and normally nonconducting during exposure, second transistor means having a negative temperature coefficient of resistance and normally conducting during exposure, and regenerative feedback means from said second transistor means to said first transistor means; and
   temperature compensating means responsive to variations in ambient temperature including resistance means with a negative temperature coefficient of resistance connected in said control circuit to decrease the conduction of said second transistor means and hence the amount of feedback generated by said feedback means with increasing ambient temperatures, whereby the effects of ambient temperature variations on said control circuit are compensated thereby.

2. A shutter mechanism for a photographic camera having an exposure aperture for exposing to scene light a photosensitive material, the sensitivity of which may vary with changes in ambient temperature, comprising:
   shutter means movable into light blocking and unblocking positions relative to said exposure aperture to effect exposure;
   a photoconductive element exposed to scene light and having an electrical parameter which varies in response to the intensity of light incident thereon;
   an electrical control circuit responsive to said parameter of said photoconductive element automatically controlling the amount of light admitted through said aperture by said shutter means, said control circuit being responsive to a control current tending to decrease with increasing ambient temperatures;
   temperature compensating means responsive to variations in ambient temperature including resistance means connected in said control circuit having a negative temperature coefficient tending to effect an increase in said control current with increasing ambient temperatures; and
   a timing circuit comprising capacitance means and said photoconductive element for varying said control current as a function of time and scene brightness, said resistance means including means connected in series with a fixed resistance connected across said timing circuit, whereby said resistance means effects a decrease with increasing ambient temperatures in the time required by said timing circuit to develop a control current of a trigger magnitude, thereby compensating for the effects of ambient temperature on said control circuit.

3. A shutter mechanism for a photographic camera having an exposure aperture for exposing to scene light a photosensitive material, the sensitivity of which may vary with changes in ambient temperature, comprising:
   shutter means movable into light blocking and unblocking positions relative to said exposure aperture to effect exposure;
   a photoconductive element exposed to scene light and having an electrical parameter which varies in response to the intensity of light incident thereon;
   an electrical control circuit responsive to said parameter of said photoconductive element automatically controlling the amount of light admitted through said aperture by said shutter means, said control circuit being responsive to a control current tending to decrease with increasing ambient temperature and including first transistor means controlled by said control current and responsive to said photoconductive element, said transistor means being normally nonconducting during exposure, second transistor means having a negative temperature coefficient of resistance and normally conducting during exposure, and regenerative feedback means from said second transistor means to said first transistor means;
   temperature compensating means responsive to variations in ambient temperature including first and second resistance means each having a negative temperature coefficient of resistance, said first resistance means being connected in said control circuit to decrease the conduction of said second transistor means and hence said feedback with increasing ambient temperatures; and
   a timing circuit comprising capacitance means and said photoconductive element for varying said control current as a function of time and scene brightness, said second resistance means including means connected in series with a fixed resistance connected across said timing circuit, whereby said second resistance means effects a decrease with increasing ambient temperatures in the time required by said timing circuit to develop a control current of a trigger magnitude, said first and second resistance means thereby compensating for the effects of ambient temperature variations on said control circuit.

4. The apparatus defined by claim 3 wherein the sensitivity of the photosensitive material varies directly with ambient temperature, and wherein said first and second resistance means constitute thermistors acting to increase said control current with increasing ambient temperature, whereby the exposure effected by said shutter means is inversely related to ambient temperature to compensate for the temperature sensitivity of the film material.

5. The apparatus defined by claim 2 including temperature-sensitive, high light level compensation means comprising second resistance means having a negative temperature coefficient connected briefly across said capacitance means in said timing circuit at the initiation of energization of said timing circuit for controlling the initial charge on said capacitance means as a function of ambient temperature, whereby said second resistance means at least partially compensates for the effect of said resistance means at high levels of scene brightness and relatively high ambient temperatures.

6. The apparatus defined by claim 3 including temperature sensitive, high light level compensation means comprising third resistance means having a negative temperature coefficient connected briefly across said capacitance means in said timing circuit at the initiation of energization of said timing circuit for controllng the initial charge on said capacitance means as a function of ambient temperature, whereby said third resistance means at least partially compensates for the combined effect of said first and second resistance means at high levels of scene brightness and relatively high ambient temperatures.

References Cited by the Examiner

UNITED STATES PATENTS

| | | | |
|---|---|---|---|
| 2,927,224 | 3/1960 | Ruehlemann | 317—131 X |
| 3,005,915 | 10/1961 | White et al. | 25—214 |
| 3,062,092 | 11/1962 | Schmidt | 88—23 |
| 3,073,220 | 1/1963 | La Rue | 95—10 |
| 3,104,323 | 9/1963 | Over et al. | 307—88.5 |
| 3,194,977 | 7/1965 | Anzalone et al. | 307—88.5 |
| 3,204,175 | 8/1965 | Kuriger | 307—88.5 |
| 3,205,799 | 9/1965 | Burgarella et al. | 95—10 |
| 3,231,787 | 1/1966 | Knudson | 317—148.5 |

FOREIGN PATENTS 1,283,096  12/1961  France.

NORTON ANSHER, *Primary Examiner.*

J. F. PETERS, *Assistant Examiner.*